United States Patent [19]

Colin

[11] 4,214,242

[45] Jul. 22, 1980

[54] METHOD AND APPARATUS FOR ELIMINATING MULTIPLE-TIME ECHOES IN PULSE DOPPLER RADARS

[75] Inventor: Jean-Marie H. Colin, Paris, France

[73] Assignee: International Standard Electric Corporation, New York, N.Y.

[21] Appl. No.: 967,076

[22] Filed: Dec. 6, 1978

[30] Foreign Application Priority Data

Dec. 8, 1977 [FR] France .............................. 77 36971

[51] Int. Cl.² ............................................. G01S 9/42
[52] U.S. Cl. .............................. 343/7.7; 343/17.1 PF
[58] Field of Search ......................... 343/7.7, 17.1 PF

[56] References Cited

U.S. PATENT DOCUMENTS

| 3,441,930 | 4/1969 | D'Obrenan et al. ................... 343/7.7 |
| 4,153,899 | 5/1979 | Taylor, Jr. .............................. 343/7.7 |

*Primary Examiner*—Maynard R. Wilbur
*Assistant Examiner*—Richard E. Berger
*Attorney, Agent, or Firm*—William T. O'Neil

[57] ABSTRACT

A method and apparatus for eliminating multiple-time echoes from the output signal train of random PRF pulse Doppler radar system. A multiple-time echo is recognized by calculation of the absolute value of the difference between the last two phase pulses received in each range gate (bin). That absolute value is compared to the average of the preceding N absolute value. A multiple-time echo is present if the last absolute value is higher by a predetermined amount than the average of the preceding N absolute values. A logical switch provides automatic switching to substitute a previous phase pulse in a corresponding range gate when the phase pulse of a range gate is determined to be altered by presence of a multiple-time (non-coherent) echo signal.

6 Claims, 9 Drawing Figures

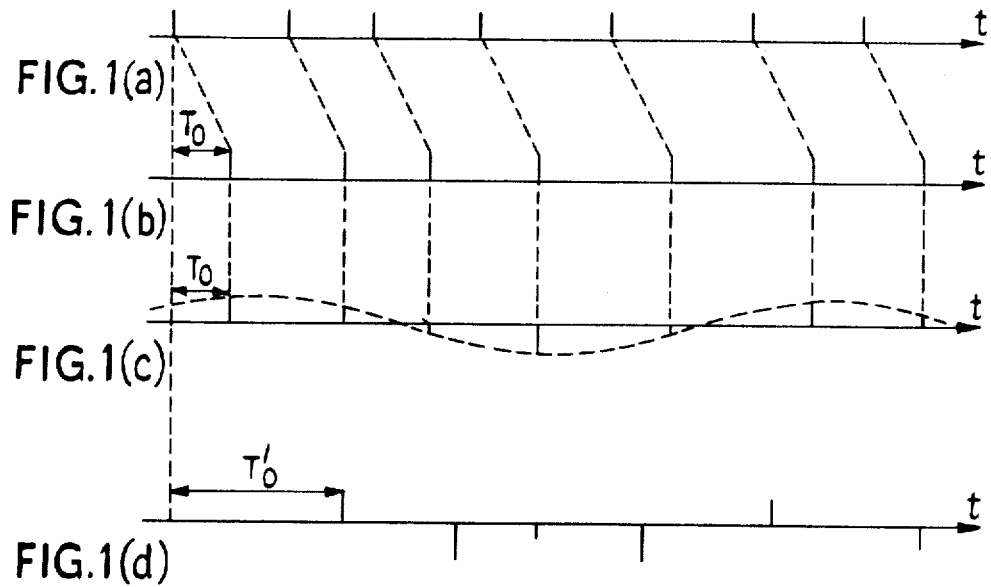
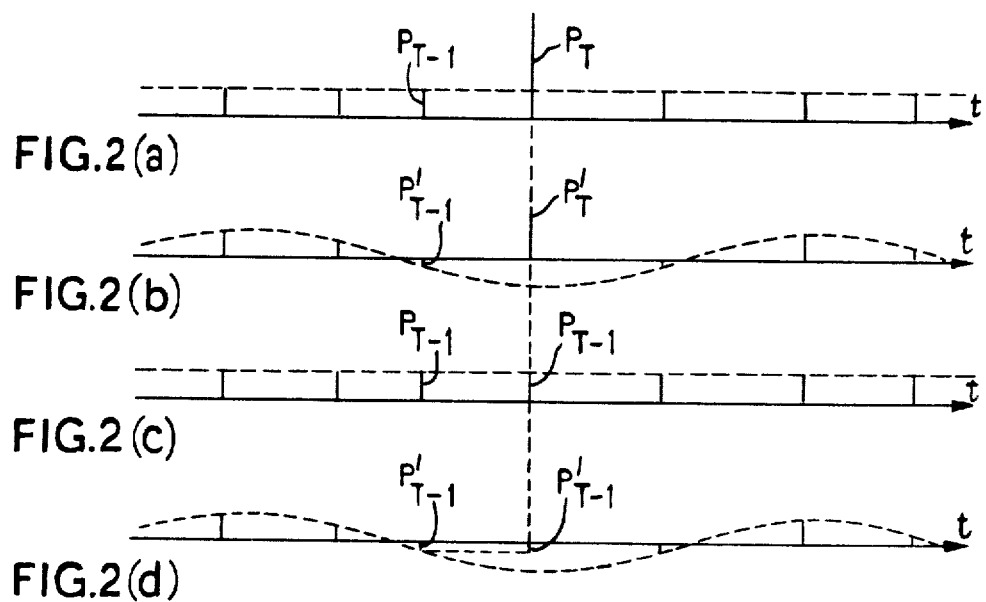

METHOD AND APPARATUS FOR ELIMINATING MULTIPLE-TIME ECHOES IN PULSE DOPPLER RADARS

BACKGROUND OF THE INVENTION

This invention concerns devices and method for eliminating multiple-time echoes in Doppler pulse radars which are coherent only on reception.

Multiple-time echoes come from distant objects located beyond the normal radar detection range, and are generated not by the most recent pulse transmitted by the radar, but by one of the preceding pulses. Especially troublesome multiple-time echoes are fixed echoes which come from mountain ranges, since their power is high with respect to that of echoes from useful targets.

It is known that, if equally spaced (in time) radar pulses are coherently transmitted, all echo pulses can be coherently processed, eliminating the problem of fixed multiple-time echoes. Such a transmitter includes an amplifier chain controlled by an oscillator which is extremely stable over durations of several pulse repetition periods, the multiple-time echoes are therefore not received in an uncorrelated condition and can be eliminated by standard cancellation or Doppler fitting, provided they are fixed, in the same way as first-time fixed echoes. However, such coherent transmitters are costly vis-a-vis the magnetron transmitter widely used.

In equally spaced (in time) pulse Doppler radars coherent only on reception (magnetron radars), multiple-time echoes, even if fixed, are no longer eliminated, since such radars operate by storing the phase of the last pulse transmitted by the radar and comparing it to the phases within the received echo pulse train. In that way the Doppler information is recovered, but the phase of pulses transmitted prior to the last pulse is no longer stored once a new pulse occurs. Since the phase of the transmitted pulse varies in a random manner from one repetition period to the next, the multiple-time echoes are uncorrelated and can no longer be eliminated, even though fixed. These echoes occupy the same range gates from one repetition period to the next and are completely mingled with the useful target echoes. The result is a "false alarm" which makes the detection of useful targets very difficult.

One known approach to this problem is based on the difference existing between the distance covered by the multiple-time echoes and the distance covered by the useful target echoes. The multiple-time echoes may cover several kilometers, which represents several range gates of a normal Doppler Radar, while the useful target echoes in most cases occupy only one range gate. A contrast detector compares the signal received in each range gate with the average of the signals received in the time adjacent gates. A useful target is recognized only if the signal in the gate in question sufficiently exceeds this average. Of course, this operation is not limited to range comparisons, but can be used in the same way with respect to bearing. One disadvantage of this method of elimination of multiple-time echoes by contrast detection is that it is ineffective for shorter range multiple-time echoes occupying, for example, in only two or three range gates. The average of the signals of the adjacent gate is, in that case, low and the multiple-time echo signal in the gate in question is much greater, which leads to false recognition of a useful target. Another disadvantage of this method is that it only allows detection of useful targets with an echo power greater than that of the multiple-time echoes. Quite often, in the case of massive mountain ranges, multiple-time echoes are much stronger than the echoes of useful targets.

Another known solution to the problem of elimination of multiple-time echoes in a Doppler radar coherent only on reception consists in using a transmitter with unequally spaced (staggered or randomized PRF) pulses. The transmitted pulses are spaced in a variable manner, which means displacing each pulse by a certain value with respect to its position in a radar with equally spaced pulses. The multiple-time echoes then possess a variable delay with respect to the last pulse transmitted and consequently occupy different range gates from one pulse to the next. Conversely, the first-time echoes have a fixed delay with respect to to the last pulse transmitted and therefore always occupy the same gate. Discrimination is possible by integration of the signals received in the same range gate over several radar repetition periods. This solution is described in particular in U.S. Pat. No. 3,441,930, however, it presents two problems of its own.

In the case of a range gate containing both a first-time echo and a multiple-time echo, the two echoes combine, resulting in erroneous Dopple information, and in the case of a range gate containing no first-time echo, but only a multiple-time echo, the average value resulting from the integration over several periods may exceed the radar detection threshold even though this echo is present only a restricted number of times in the gate, because its power is often very large, and the result is a "false alarm."

The manner in which the present invention deals with the disadvantages of the prior art to provide a novel advantageous solution to the problem will be understood as this description proceeds.

SUMMARY OF THE INVENTION

The general object of the invention is provision of a method and apparatus for the elimination of multiple-time echoes in a Doppler pulse radar using unequally spaced pulses and coherent reception.

The method and apparatus according to the invention, are used in a radar which supplies, in the conventional way, for each range gate, a pulse representing the phase of the echo with respect to that of the last pulse transmitted, and are characterized maininly in that they include, for each range gate, the following:

(1) recognizing a multiple-time echo, and
(2) replacing the corresponding phase pulse by the preceding phase pulse.

According to another characteristic of the invention, recognition of a multiple-time echo consists in:

(1) calculating the absolute value of the difference between the last two phase pulses received in the gate in question;
(2) comparing this absolute value to the average of the N absolute values previously calculated, for the gate in question, and
(3) deciding that a multiple-time echo is present if the last absolute value calculated is at least k times greater than the average of the preceding N absolute values.

The device for the elimination of multiple-time echoes according to the invention offers the advantage of being relatively simple, and can be inserted in an already existing equally spaced pulse Doppler radar, with only a few relatively simple modifications, in particular at the level of the clock to convert the equally spaced pulses (constant PRF) into unequally spaced pulses (staggered PRF).

Other characteristics and advantages of the invention will be brought out in the description to follow, presented in connection with the drawings.

BRIEF DESCRIPTION OF THE DRAWINGS

FIGS. 1(a) to 1(d) present timing waveforms for a Doppler radar using unequally spaced pulses.

FIGS. 2(a) and 2(b) represent pulses disturbed by a multiple-time echo.

FIGS. 2(c) and 2(d) show these same pulses as in FIGS. 2(a) and 2(b) corrected according to the process of the invention.

DETAILED DESCRIPTION

Figure 3:
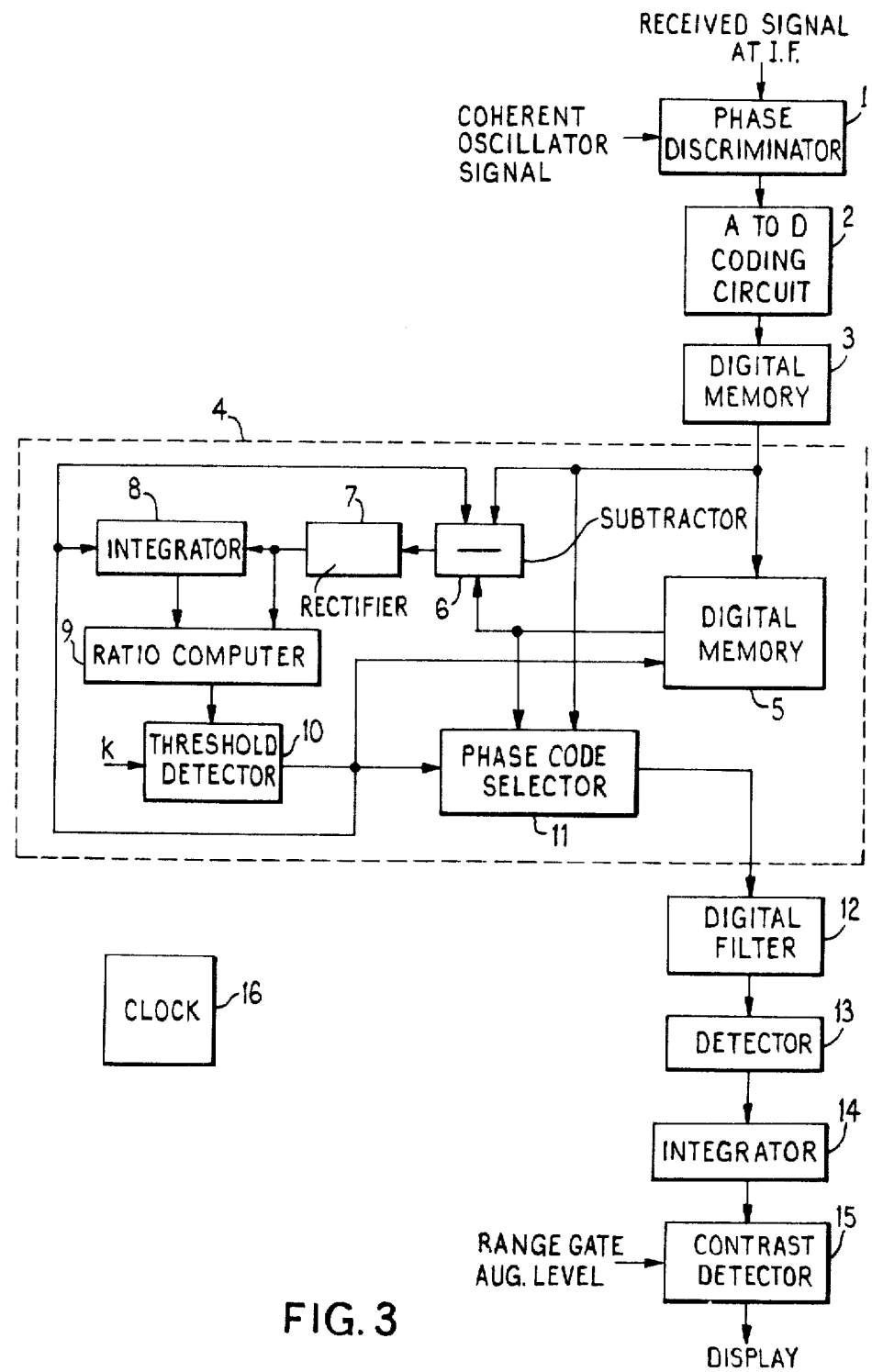
FIG. 3 depicts the block diagram of a typical device for the elimination of multiple-time echoes according to the invention.

Before decribing the process for eleimination of multiple-time echoes from received signals according to the invention, we shall review the familiar operation of a Doppler radar with unequally spaced pulses, with reference to FIGS. 1(a) to 1(d). The pulses transmitted by the radar as a function of time t are shown in FIG. 1(a). The series of intervals between pulses constitutes a pattern which is repeated within regular periods. This pattern is composed of a certain number P of irregularly spaced pulses creating M different time spaces. The duration of the pattern before it is repeated can correspond to the passage of the antenna beam across the target, for example.

A fixed first-time echo will be expressed, at the output of the phase discriminator of the receiver, by pulses of equal amplitude, representing a constant phase, delayed by a time $T_o$ fixed with respect to the last pulse transmitted, as shown in FIG. 1(b).

A moving first-time echo will be expressed by unequal pulses whose amplitude envelope represents the Doppler frequency signal of the moving target, as shown in FIG. 1(c). Each received pulse is delayed by a time virtually fixed with respect to the last pulse transmitted. It is assumed, in FIG. 1(c) that the transmit-receive delay is also equal to $T_o$.

A multiple-time echo at the output of the phase discriminator will be characterized by pulses of random amplitude, as shown in FIG. 1(d). This random amplitude corresponds to a random phase with respect to the phase of the last pulse transmitted. Moreover, each received pulse presents a constant delay $T'_o$, not with respect to the last pulse transmitted, but rather with respect to the pulse before the last transmitted one (or even to an earlier preceding pulse if the target corresponding to the multiple-time echo is very distant). The delay of each such received pulse corresponding to a multiple-time is variable with respect to the last pulse transmitted. This means that a multiple-time echo does not appear in the same range gate on each recurrence, as it is the case with a first-time echo, (or as would be true in a constant PRF situation) but only once in M times on an average, assuming that the target is pin-pointed.

FIG. 2(a) shows, as a function of time, the phase pulses appearing in a range gate containing a fixed first-time echo. All the pulses have the same amplitude, except for a pulse $p_T$ which is different, occurring an average of once in M times as a result of mingling with a multiple-time echo. FIG. 2(b) shows the same information as FIG. 2(a), except that it applies to a case in which the range gate in question contains a moving first-time echo. The values of the various pulses correspond to the sine, or cosine, of the Doppler frequency signal of the moving target, except for a pulse $p'_T$ occurring an average of once in M times, which is affected by the multiple-time echo aforementioned.

The process of elimination of multiple-time echoes according to the invention consists, for each range gate, in:

(1) recognizing a multiple-time echo, and (2) replacing the phase pulse altered with the phase pulse determined at the preceding recurrence. This is illustrated by means of FIGS. 2(c) and 2(d). In the case of a fixed first-time echo, the altered pulse $p_T$ is replaced by the preceding pulse $p_{T-1}$, as shown in FIG. 2(c). The same is true for the case of a moving first-time echo, where the altered pulse $p'_T$ is replaced by the preceding pulse $p'_{T-1}$, as shown in FIG. 2(d).

It will be noted that, in the case of a fixed echo, the altered pulse is replaced by the pulse theoretically expected from a fixed target, without any error, which permits very good elimination of the fixed echo in a later step. In the case of a moving echo, the altered pulse is not exactly replaced by the theoretically expected pulse, but the resulting loss of coherence negligible, especially if M is large enough, for example, greater than five. Thus, an excellent visibility factor is obtained for moving targets.

A multiple-time echo is recognized, for each range gate, in the folloiwng way, according to the steps of:

(1) calculating the absolute value of the difference between the last two phase pulses received in the gate in question, and (2) comparing of this absolute value with the average of the N absolute values previously calculated, relating to this same gate.

A multiple-time echo is recognized if the last absolute value calculated is at least k times greater than the preceding N absolute values. For instance, let us assume;

N=10 k=2.

When the multiple-time echo is not recognized, the altered pulse subsists, but it will not be very different from the theoretically expected pulse since the last absolute value calculated is less than k times the average of the preceding N absolute values. Moreover, the said altered pulse exists only once in M times on an average. The multiple-time echo then behaves somewhat like weak noise, which will not work or prevent the detection of moving targets.

We have assumed for the moment that the multiple-time echoes were pin-pointed in time; actually, quite often, they are spread over several adjacent gates from one period to the next, as required for their recognition according to the invention, we shall choose an increment of variation of the transmission interpulse period equal at least to the maximum time width of a multiple-time echo.

For a case in which several scattered multiple-time echoes were reflected from mutually separated objects, the probability of their occupying the same range gate is very low, and they would, therefore, be eliminated by the process according to the invention.

FIG. 3 shows a block diagram of the device for the elimination of multiple-time echoes according to the invention, inserted in a Doppler radar with unequally spaced pulses, using digital operation. We find the usual phase discriminator 1 delivering the phase of the received echo, after conversion to the intermediate frequency, with respect to a signal coherent with the last pulse transmitted. The phase is sampled and coded by means of an analog-to-digital sampling and coding circuit 2, with a sampling period equal to the scanning period of one portion of range. A memory 3 stores, as they arrive, the phase codes of the different range increments (bins) defined during the pulse period in progress, and delivers them, in the same order, during the next period. Those elements, per se, and their arrangement to that point are prior art, of course.

The device for the elimination of multiple-time echoes according to the invention, designated in FIG. 3 by the numeral 4, contains a second memory 5, identical with memory 3, storing the codes read from memory 3 and delivering them with a delay of one pulse period. Thus, available at the output of both memories 3 and 5 are the codes of the last two pulse periods preceding the period in progress. A subtractor 6, receiving the codes from the two memories, carries out the subtraction of the two codes for each range portion. A rectifier 7, located at the output of subtracter 6, delivers the absolute value of the result. In practice, this rectifier does not exist physically, and the operation simply consists in ignoring the sign bit of the subtracter output. Rectifier 7 is connected to an integrator 8 which calculates, for each range portion, the average of the N absolute values determined during the preceding N pulse periods. A ratio computer 9, receiving on the one hand this average delivered by integrator 8 and on the other hand the last absolute value delivered by rectifier 7, furnishes the ratio between these two values. A threshold detector 10 delivers a logical 0 or 1 selection signal depending upon whether the ratio is less than or greater than the threshold value k. At the output of the multiple-time echo elimination device, a selector 11, controlled by the said selection signal, delivers, for each range portion, either the phase code furnished by memory 3 if the ratio is less than the threshold k, or the preceding code furnished by memory 5 if this ratio is greater than k. If a multiple-time echo is recognized, that is to say when the threshold k is exceeded, the output signal of the threshold detector 10 blocks the integrator 8, the subtracter 6 and the write operation in memory 5 during the following pulse period, thus preventing the altered code from being stored in this memory. The blocking of integrator 8 prevents it from accepting the subtraction result corresponding to a multiple-time echo which, if accepted, would improperly influence the calculated average value. The blocking of subtracter 6 and of write operation in memory 5 prevents the subtracter from delivering a value which would cause the threshold detector 10 to react in the same way as for a multiple-time echo, but which would be due in fact to the presence of a multiple-time echo during the preceding pulse period. This situation is easily understood by referring to FIGS. 2(a) and 2(b).

At the output of the multiple-time echo elimination device 4, we find the usual Doppler processing circuits, that is to say a digital filter unit 12 followed by a detector 13 and an integrator 14. A constrast detector 15 can be placed at the output of integrator 14 in order to eliminate all noise signals distributed output of integrator 14 in order to eliminate all noise signals distributed in range. It operates in a known manner by comparison of the level of each range gate with the average level of the adjacent gates.

A clock 16 controls the entire system in a manner well understood in this art. In particular, it produces the unequally spaced pulses, for controlling the transmitter, as well as the addresses of memories 3 and 5.

Although this device has been described with a particular embodiment, it is clearly capable of variation or modifications within the scope of the invention. For instance, the device could be designed using analog technology, with a few modifications known by those skilled in the art.

What is claimed is:

1. A method for decreasing the effect of multiple-time echoes in the receiving signals of pulse Doppler radar apparatus of the type employing unequal transmitted pulse spacing and coherent only on reception, comprising the steps of:
   computing within each range gate, the absolute value of the difference between the last two phase pulses received;
   comparing the computed absolute value thus obtained to the average of N absolute values previously computed;
   determining the presence of a multiple-time echo whenever the last of said absolute values is at least k times greater than the average of the preceding N absolute values; and
   substituting the last previous phase pulse for that detected in a range gate in which said absolute value is greater than k times the average of said preceding N absolute values.

2. Apparatus for reducing the effect of multiple-time echoes in the received echo signals of a pulse Doppler radar with a pulse transmitter having a variable transmitted pulse repetition interval and coherent received signal processing, comprising:
   phase discriminator means for producing output signals as a function of the instantaneous phase between the received signals in each pulse repetition interval and the transmitted pulse at the inception of each of said intervals;
   first means for digitally encoding and storing, by amplitude, said phase discriminator output signals discretely in a plurality of corresponding range gates in each successive pulse repetition interval;
   second means for delaying and storing the coded values stored in said first means by one pulse repetition interval;
   third means for providing signals which are the absolute values of the difference of said coded values stored in said first and second means;
   fourth means for integrating the average of the preceding N absolute values produced by said third means;
   fifth means for computing the ratio of the last absolute value delivered by said third means and said average produced by said fourth means;
   a Doppler filter;
   and sixth means responsive to said ratio computed by said fifth means for providing the stored signal values of said first means to said Doppler filter if said ratio computed by said fifth means is less than a predetermined value k, and for providing the stored signal values of said second means to said Doppler filter if the value of said ratio is greater than said k.

3. Apparatus according to claim 2 in which additional means are provided for blocking the storing operation of said second means and the operation of said third and fourth means whenever said sixth means output exceeds said predetermined value k, signfying the presence of a multiple-time signal, thereby preventing the storage of the altered signal code selected by said sixth means in said second means.

4. Apparatus according to claim 2 in which said value of k is at least 2.

5. Apparatus according to claim 2 in which said value of N is at least 10.

6. Apparatus according to claim 2 in which said pulse transmitter is further defined in that said variable pulse repetition interval is defined as a repetitive sequence of P pulse repetition intervals, said sequence having a time duration comparable to the dwell time of a scanning antenna beam of said radar on a point target.

* * * * *